United States Patent [19]
Huber

[11] Patent Number: 5,697,678
[45] Date of Patent: Dec. 16, 1997

[54] HYDRAULIC UNIT SUPPORTED IN SUCH A WAY AS TO DAMP VIBRATION AND FORMING PART OF A SLIP-CONTROLLED BRAKE SYSTEM

[75] Inventor: Siegfried Huber, Weinsberg, Germany

[73] Assignee: Robert Bosch GmbH, Stuttgart, Germany

[21] Appl. No.: 553,369

[22] PCT Filed: May 11, 1994

[86] PCT No.: PCT/DE94/00541
§ 371 Date: Nov. 27, 1995
§ 102(e) Date: Nov. 27, 1995

[87] PCT Pub. No.: WO94/27846
PCT Pub. Date: Dec. 8, 1994

[30] Foreign Application Priority Data

May 26, 1993 [DE] Germany ............ 43 17 467.1

[51] Int. Cl.⁶ .......... F04B 39/00; F16F 15/02; B60T 8/36
[52] U.S. Cl. .......... 303/116.4; 417/363
[58] Field of Search .......... 303/116.4; 417/363

[56] References Cited

U.S. PATENT DOCUMENTS 4,636,673  1/1987  McDonald .............. 417/363

FOREIGN PATENT DOCUMENTS

| 187589 | 11/1983 | Japan | 417/363 |
| 192875 | 11/1984 | Japan | 417/363 |
| 134083 | 5/1989 | Japan | 417/363 |

Primary Examiner—Matthew C. Graham
Attorney, Agent, or Firm—Edwin E. Greigg; Ronald E. Greigg

[57] ABSTRACT

A vibration damping arrangement for improving the structure-borne noise isolation of a hydraulic unit forming part of a slip-controlled brake system from a vehicle. The hydraulic unit is supported elastically on the vehicle, below its center of gravity, on three rubber spring elements. In this arrangement, the rubber spring elements are situated both in front of and behind a vertical projection of the center of gravity and symmetrically in and on both sides of a vertical plane passing through the center of gravity. In addition, the three rubber spring elements are arranged along the lateral surface of an imaginary circular cylinder, on the horizontally extending longitudinal axis of which the center of gravity of the hydraulic unit lies. The rubber spring elements are formed of disk springs, the ends of which, carry fastening elements, extend approximately tangentially to the lateral surface of the imaginary circular cylinder.

2 Claims, 1 Drawing Sheet

HYDRAULIC UNIT SUPPORTED IN SUCH A WAY AS TO DAMP VIBRATION AND FORMING PART OF A SLIP-CONTROLLED BRAKE SYSTEM

PRIOR ART

The invention relates to a hydraulic unit which is supported in such a way as to damp vibration of a slip-controlled brake system.

Such a vibration-damping support system for a hydraulic unit in a vehicle has already been disclosed (DE-C-39 41 401). In this support system, the housing of the hydraulic unit is provided on opposite end faces with three horizontally extending studs, each of which engages in a rubber shaped part seated in a cap-shaped component connected to the body of the vehicle. During slip control, vibrations of the hydraulic unit, particularly those excited by the reciprocating-piston pump, are not fully damped since the rubber shaped parts are subjected essentially to compressive stress.

ADVANTAGES OF THE INVENTION

In contrast, the hydraulic unit is supported in accordance with the invention in such a way as to damp vibration has the advantage that the ... rubber spring elements are subjected primarily to shear during the operation of the pump, i.e. in a manner in which the lower spring rate—as compared with compressive or tensile stress—characteristic of rubber is exploited. This improves the effectiveness with which the transmission of structure-borne noise from the hydraulic unit to the vehicle body is isolated.

The development of the invention specified herein increases the degree of assembly of the hydraulic unit and facilitates installation in the vehicle. In addition, incorrect mounting of the rubber spring elements is avoided.

BRIEF DESCRIPTION OF THE DRAWINGS

An exemplary embodiment of the invention is illustrated in simplified form in the drawing and explained in greater detail in the following description.

DETAILED DESCRIPTION OF THE EXEMPLARY EMBODIMENT

Figure 1:
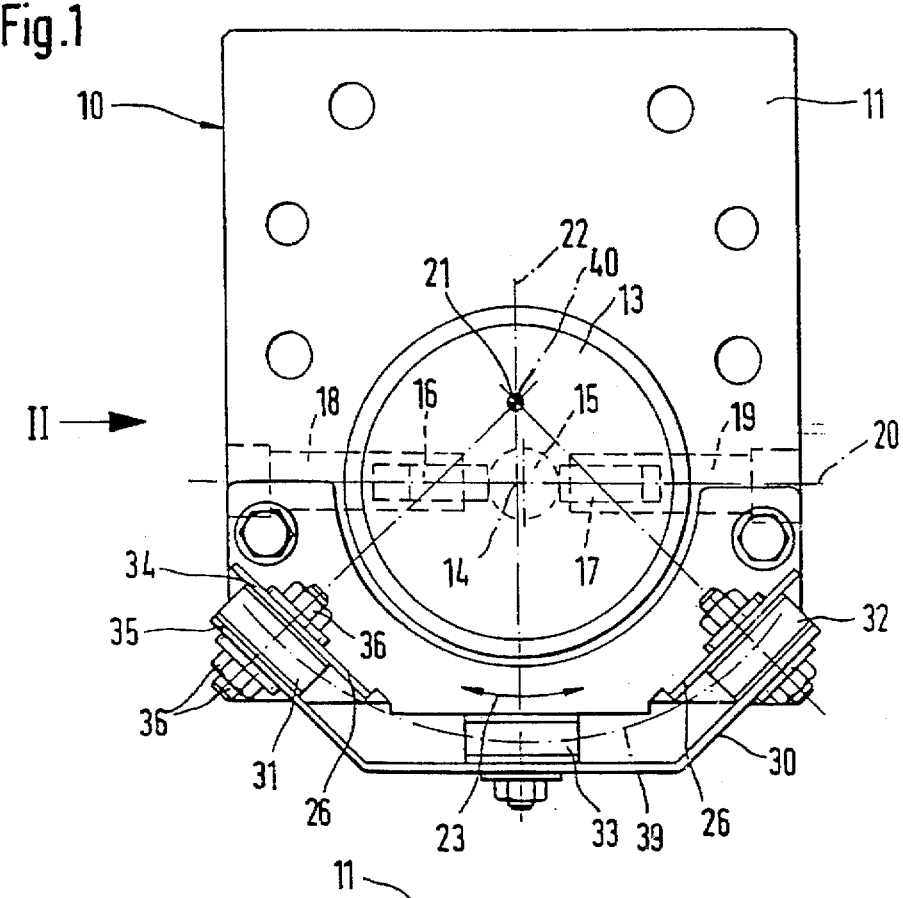
FIG. 1 shows an end view of a hydraulic unit with the arrangement of rubber spring elements and FIG. 2 shows a side view of the hydraulic unit in the direction of arrow II in FIG. 1.
Figure 2:
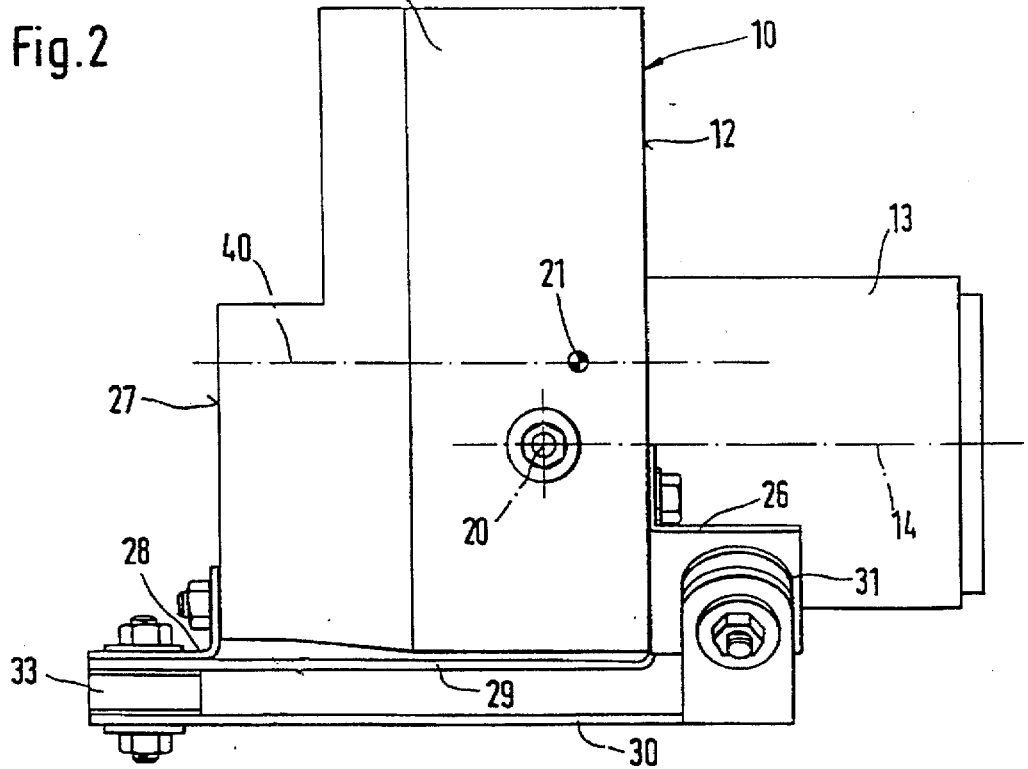

The hydraulic unit 10 illustrated in FIGS. 1 and 2 of the drawing is part of a slip-controlled brake system (not shown) of a vehicle, especially a passenger vehicle. The hydraulic unit 10 has a housing 11 with the approximate shape of a cuboid standing on an edge. An electric drive motor 13 is attached to a vertical end face 12 of the housing 11. The motor 13 serves to drive in rotation an eccentric shaft 15 arranged with its longitudinal axis 14 horizontal. Engaging on said shaft on both sides are respective reciprocating pistons 16 and 17 of reciprocating-piston pumps 18 and 19. The horizontally extending longitudinal axes 20 of the reciprocating-piston pumps 18 and 19 arranged in the housing 11 of the hydraulic unit 10 intersect the longitudinal axis 14 of the eccentric shaft 15 at right angles. The center of gravity 21 of the hydraulic unit 10 is at a distance above the longitudinal axis 20, within the housing 11, in a vertical plane 22 passing through the shaft longitudinal axis 14. The hydraulic unit 10 is accordingly excited into torsional vibrations in the direction of the double arrow 23 indicated in FIG. 1 about the center of gravity 21 by the reciprocating pistons 16 and 17, which are driven in translation.

A twin angle bracket 26 formed from sheet metal is fastened to the motor-side end face 12 of the housing 11. A single angle bracket 28 made of sheet metal is bolted to the opposite end face 27 of the housing 11 (FIG. 2). As shown, the twin angle bracket 26 and the single angle bracket 28 can be connected to one another by a link 29. A holder 30 designed as a sheet-metal shaped part is furthermore illustrated at a distance underneath the hydraulic unit 10. This holder is designed (in a manner not shown) to be fastened to the vehicle. Two rubber spring elements 31 and 32 are arranged between the double angle bracket 26 and the holder 30, and one rubber spring element 33 is arranged between the single angle bracket 28 and the holder 30. At their ends 34 and 35, the rubber-spring elements 31 to 33, which are designed as rubber-metal springs in the form of disk springs, are screwed to the twin angle bracket 26 and single angle bracket 28, on the one hand, and to the holder 30, on the other hand, by fastening means 36 in the form of bolts and nuts. As seen in the direction of the shaft longitudinal axis 14 in FIG. 1, the three rubber spring elements 31 to 33 are arranged both in front of (31, 32) and behind (33) a vertical projection of the center of gravity 21 and also symmetrically in (33) and on both sides of (31, 32) the vertical plane 22. As can also be seen from FIG. 1 of the drawing, the three rubber spring elements 31 to 33 are furthermore arranged along the lateral surface 39 of an imaginary circular cylinder, on the longitudinal axis 40 of which, said longitudinal axis running horizontally and being parallel to the shaft longitudinal axis 14, the center of gravity 21 of the hydraulic unit 10 lies. In this arrangement, the ends 34 and 35 of the rubber spring elements 31 to 33 extend approximately tangentially to the lateral surface 39 of the imaginary circular cylinder.

The hydraulic unit 10 is thus supported elastically and in a stable manner on the vehicle by three rubber spring elements 31 to 33 below its center of gravity 21. Under excitation by the motor-driven reciprocating-piston pumps 18 and 19, it can vibrate about the longitudinal axis 40 of the circular cylinder, along the lateral surface 39 of which the rubber spring elements 31 to 33 are arranged. In this arrangement, the rubber spring elements 31 to 33 are subjected to parallel shear stress and, as a result, effective damping of the vibratory motion of the hydraulic unit 10 in the direction of the double arrow 23 is achieved by virtue of the low spring rate of rubber as a material. Since the resonant frequency of the rubber spring elements 31 to 33 in relation to the excitation frequency of the hydraulic unit 10 is low, this leads to good structure-borne noise isolation of the hydraulic unit from the vehicle.

The foregoing relates to preferred exemplary embodiments of the invention, it being understood that other variants and embodiments thereof are possible within the spirit and scope of the invention, the latter being defined by the appended claims.

I claim:

1. A hydraulic unit (10) which is supported in such a way as to damp vibration and forms part of a slip-controlled brake system of a passenger vehicle, having at least one reciprocating-piston pump (18, 19) with reciprocating pistons (16, 17) in which a longitudinal axis (20) of the reciprocating piston (16, 17) of the pump (18, 19), which is actuated by a rotating, horizontally extending eccentric shaft (15), runs at a distance from a center of gravity (21) of the hydraulic unit (10), the housing (11) of the hydraulic unit (10) is supported elastically on the vehicle by three rubber spring elements (31, 32, 33), in relation to a vertical plane (22) passing through the center of gravity (21) and the longitudinal axis (14) of the eccentric shaft (15), the rubber spring elements (31, 32, 33) are, as seen in a direction of a shaft longitudinal axis (14), arranged both in front of and behind a vertical projection of the center of gravity (21) and symmetrically and on both sides of a vertical plane (22), the three rubber spring elements (31, 32, 33) are arranged below a center of gravity (21) of the hydraulic unit (10), the three rubber spring elements (31, 32, 33) are arranged along a lateral surface (39) of an imaginary circular cylinder, on the horizontally extending longitudinal axis (40), which also runs parallel to the longitudinal axis (14) of the eccentric shaft (15), of which the center of gravity (21) of the hydraulic unit (10) lies, the rubber spring elements (31, 32, 33) are formed of disk springs, the ends (34, 35) of the rubber spring elements carry fastening means (36) which extend approximately tangentially to the lateral surface (39) of the imaginary circular cylinder.

2. The hydraulic unit as claimed in claim 1, wherein the rubber spring elements (31, 32, 33) are fastened to the housing (11) of the hydraulic unit (10) and are connected to a holder (30) formed of a sheet-metal shaped part which is intended for fastening to the vehicle.

* * * * *